Patented Aug. 11, 1931

1,818,934

UNITED STATES PATENT OFFICE

JAN TEPPEMA, OF AKRON, OHIO, ASSIGNOR TO THE GOODYEAR TIRE & RUBBER COMPANY, OF AKRON, OHIO, A CORPORATION OF OHIO

ACCELERATION OF VULCANIZATION OF RUBBER

No Drawing.   Application filed November 21, 1927. Serial No. 234,925.

My invention relates to methods of vulcanizing rubber, and it has, for its primary object, the provision of a new class of materials adapted to accelerate or promote the rate of vulcanization when incorporated in a rubber compound.

More specifically, my invention has for one of its objects the provision of an improved accelerator which is composed of the reaction product of mercaptoarylthiazoles having substitutions made in the aryl ring and amino compounds.

It has been observed heretofore that many thiazole compounds could be employed as accelerators of the rate of vulcanization of rubber with excellent results. Among the first compounds of this class discovered was mercaptobenzothiazole, which may be represented structurally as follows:

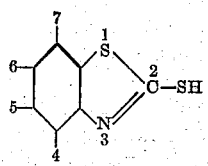

The numerals applied to various atoms indicate the position of the atom in the molecule.

More recently it has been discovered that substituted mercaptobenzothiazoles, particularly those containing substitutions in the aryl ring, also may be employed as accelerators with excellent results. Among such compounds 5-chlor mercaptobenzothiazole and 6-nitro mercaptobenzothiazole are included.

There are also numerous other compounds of this class which are more or less powerful as accelerators.

I have made the discovery that the mercaptoarylthiazoles having one or more hydrogen atoms in the aryl ring replaced by heavier molecules, either negative or positive, may also be made to react further with amines, either aryl or aliphatic, to produce double salts, which, when incorporated into a rubber compound, very powerfully accelerate the vulcanization thereof.

This class of accelerators includes the reaction products of 5-chlor-mercaptobenzothiazole and diphenylguanidine, 6-nitro-mercaptobenzothiazole and diphenylguanidine, 6-amino-mercaptobenzothiazole and diphenylguanidine, chlor - mercaptobenzothiazole and diethylamine, 6-amido-mercaptobenzothiazole and diethylamine and various other similar substances.

The reaction product of 5-chlor-mercaptobenzothiazole and diphenylguanidine is particularly referred to and one method of preparing this material is as follows:

Dissolve molecular quantities of 5-chlor-mercaptobenzothiazole and diphenylguanidine in separate solutions of alcohol, and then intermix the solutions. Upon allowing the mixture to cool, the reaction product separates out as a crystalline product which may be filtered and washed with alcohol and then dried. This material has a definite melting point of about 174° to 175° C. The fact that the material has a crystalline structure, and also a definite melting point, is convincing evidence that a true chemical addition product is formed. The chemical equation by means of which the compound is formed may be represented as follows:

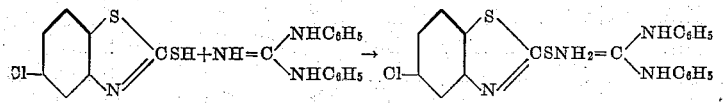

The method outlined above is not limited to the particular compounds just discussed, but may be employed to manufacture many other compounds of this class. For example, it may be employed to manufacture the addition product of 6-nitro-mercaptobenzothiazole and diphenylguanidine, 6-amino-mercaptobenzothiazole and diphenylguanidine, etc. It has been found in the case of the reaction product of the nitro mercaptobenzothiazole and diphenylguanidine that a purer compound is obtained by using double molecular quantities of the diphenylguanidine. The melting point of the reaction product obtained from these materials is about 200° C, and the melting point of the reaction product of the amino mercaptobenzothiazole and diphenylguanidine is 168° C. These definite melting points indicate that, like the reaction product of 5-chlor-mercaptobenzothiazole and diphenylguanidine, the latter reaction products are also definite chemical compounds.

Other methods than that just discussed may be employed in the manufacture of certain reaction products of this class. For example, the diethylamine salt of 5-chlor-mercaptobenzothiazole is most readily prepared by causing the materials to react in an ether solution. In the reaction, about 10 grams of 5-mercaptobenzothiazole are dissolved in 500 cc. of dry ether. Dry diethylamine, prepared by boiling commercial diethylamine and conducting the vapor over potassium hydroxide, is then bubbled through the solution. The reaction product of the 5-chlor-mercaptobenzothiazole and the diethylamine precipitates out in the form of white crystalline needles having a definite melting point at 142° to 143° C.

The reaction product of diethylamine and 6-amido-mercaptobenzothiazole may be prepared by saturating a solution composed of 10 grams of 6-amido-mercaptobenzothiazole dissolved in 100 cc. of aniline with dry diethylamine. The reaction product precipitates in the form of a colorless crystalline material which melts at about 250° to 260° C., the lack of sharpness of the melting point being apparently due to a decomposition of the reaction product.

The materials discussed may, of course, be employed as accelerators of vulcanization in most of the standard rubber compounds. The following is an example of a compound in which they may be incorporated with excellent results:

| | |
|---|---|
| Rubber | 100 parts |
| Zinc oxide | 5 parts |
| Sulfur | 3 parts |
| Stearic acid | 1.5 parts |
| Accelerator | 1 part |

The substances indicated in the following tables were employed as accelerators in this compound, and the data obtained by subjecting the products obtained to a tensile strength test are tabulated in conjunction therewith.

| Cure | kgs./cm.² at 700% el. | Tensile strength kgs./cm.² | Percent elongation |
|---|---|---|---|
| (1) Reaction product of diphenylguanidine with 5-chlormercaptobenzothiazole (M. P. 174°–175°) | | | |
| 10 min. at 20# | 178 | 244 | 760 |
| 30 min. at 20# | | 290 | 675 |
| (2) Reaction product of diphenylguanidine with 6-nitro mercaptobenzothiazole (M. P. 200°) | | | |
| 10 min. at 20# | 158 | 254 | 790 |
| 30 min. at 20# | | 290 | 695 |
| (3) Reaction product of diphenylguanidine with 6-amino mercaptobenzothiazole (M. P. 168°) | | | |
| 10 min. at 20# | 52 | 138 | 885 |
| 30 min. at 20# | 141 | 227 | 790 |
| 30 min. at 40# | 218 | 235 | 715 |
| (4) Diethylamine salt of chlormercaptobenzothiazole (M. P. 143°–142°) | | | |
| 20 min. at 20# | 190 | 226 | 710 |
| 40 min. at 20# | | 212 | 660 |
| 60 min. at 20# | | 248 | 670 |
| 50 min. at 40# | | 156 | 650 |
| 70 min. at 40# | 184 | 240 | 750 |
| (5) Diethylamine salt of 6-amido mercaptobenzothiazole (M. P. 250°–260°) | | | |
| 40 min. at 20# | 26 | 62 | 810 |
| 60 min. at 20# | 40 | 84 | 825 |
| 50 min. at 40# | 106 | 164 | 775 |
| 70 min. at 40# | 130 | 182 | 755 |

It will be observed that the reaction product of the 5-chlor mercaptobenzothiazole and diphenylguanidine is the more powerful accelerator in this class of materials. However, all of the salts enumerated have very considerable power as accelerators, and it is desired, therefore, to include them in the scope of my invention.

My invention is not limited merely to the reaction products of mercaptoarylthiazoles containing substitutions in the aryl ring and diphenylguanidine, but also includes various reaction products of the thiazole derivatives with other amines, both straight chain and aromatic.

I have disclosed a considerable number of substances of the same class which may be regarded as substantially equivalent to each other. It is evident, therefore, that my invention is not limited to a single substance, but includes a large class of related compounds, and my invention should be broadly construed as including all of these compounds. Only such limitations should, therefore, be imposed as are indicated by the appended claims.

What I claim is:

1. A method of vulcanizing rubber which comprises incorporating a reaction product of mercaptobenzothiazole containing basic nitrogen susbstituted for a hydrogen atom in the aryl ring and a secondary amine consisting of basic nitrogen, hydrogen and carbon into a vulcanizable rubber compound and heating the mixture thus formed.

2. A method of vulcanizing rubber which comprises incorporating a reaction product of a mercaptobenzothiazole containing basic nitrogen substituted for a hydrogen atom in the aryl ring and diphenylguanidine into a vulcanizable rubber compounds, and heating the mixture thus formed.

3. A rubber product which has been vulcanized in the presence of a reaction product of a mercaptobenzothiazole having a nitrogen containing group substituted for a hydrogen atom in the aryl ring and a secondary amine containing only basic nitrogen, carbon and hydrogen.

4. A method of treating rubber which comprises subjecting it to vulcanization in the presence of an accelerator having the formula

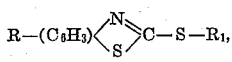

in which R represents an inorganic group other than hydrogen and R₁ represents an amine containing only nitrogen, carbon and hydrogen.

5. A method of treating rubber which comprises subjecting it to vulcanization in the presence of an accelerator having the formula

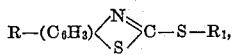

in which R represents a nitrogen containing group or chlorine atom and R₁ represents an amine containing only basic nitrogen, carbon and hydrogen.

6. A method of treating rubber which comprises subjecting it to vulcanization in the presence of an accelerator having the formula

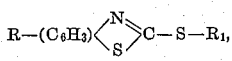

in which R represents a nitrogen containing group or a chlorine atom and R₁ represents a secondary aromatic amine group containing only basic nitrogen, carbon and hydrogen.

7. A method of treating rubber which comprises subjecting it to vulcanization in the presence of an accelerator having the formula

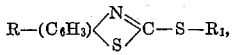

in which R represents a nitrogen containing group or a chlorine atom and R₁ represents a secondary amine containing only basic nitrogen, carbon and hydrogen.

8. A method of treating rubber which comprises subjecting it to vulcanization in the presence of an accelerator having the formula

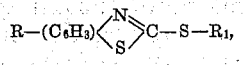

in which R represents an amido group and R₁ represents a secondary amine group consisting of basic nitrogen, carbon and hydrogen.

9. A rubber product that has been vulcanized in the presence of a material having the formula

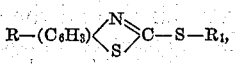

in which R represents an inorganic radical other than hydrogen and R₁ represents an amine group containing only basic nitrogen, carbon and hydrogen.

10. A rubber product that has been vulcanized in the presence of a material having the formula

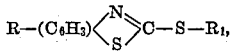

in which R represents either a nitrogen containing group or a chlorine atom and R₁ represents a secondary amine group.

11. A rubber product that has been vulcanized in the presence of a material having the formula

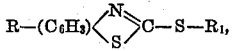

in which R represents either a nitrogen containing group or a chlorine atom and R₁ represents a secondary aromatic amine group containing only basic nitrogen, carbon and hydrogen.

12. A rubber product that has been vulcanized in the presence of a material having the formula

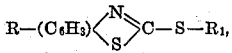

in which R represents either a nitrogen containing group or a chlorine atom and R₁ represents diphenylguanidine.

13. A method of vulcanizing rubber which comprises subjecting it to vulcanization in the presence of the reaction product of amido mercaptobenzothiazole and diphenylguanidine.

14. A rubber product that has been vulcanized in the presence of the reaction product of amido mercaptobenzothiazole and diphenylguanidine.

15. A method of vulcanizing rubber which comprises subjecting it to vulcanization in the presence of an accelerator selected from a group consisting of the reaction product of diphenylguanidine and 5-chlor mercaptobenzothiazole, the reaction product of diphenylguanidine and 6-nitro mercaptobenzothiazole, the reaction product of diphenylguanidine and 6-amino mercaptobenzothiazole, the diethyl amine salt of chlor mercaptobenzothiazole and the diethyl-amine salt of 6-amino mercaptobenzothiazole.

16. A rubber product that has been vulcanized in the presence of a material selected from a group consisting of the reaction product of diphenylguanidine and 5-chlor mercaptobenzothiazole, the reaction product of diphenylguanidine and 6-nitro mercaptobenzothiazole, the reaction product of diphenylguanidine and 6-amino mercaptobenzothiazole, the diethyl amine salt of chlor mercaptobenzothiazole and the diethylamine salt of 6-amino mercaptobenzothiazole.

In witness whereof, I have hereunto signed may name.

Signed at Akron, in the county of Summit, and State of Ohio, this 19th day of November, 1927.

JAN TEPPEMA.